United States Patent [19]
Shirasaki

[11] 3,906,534
[45] Sept. 16, 1975

[54] DEVICE FOR MOUNTING AND DISMOUNTING AN INTERCHANGEABLE LENS

[75] Inventor: Takayuki Shirasaki, Yokohama, Japan

[73] Assignee: Canon Kabushiki Kaisha, Tokyo, Japan

[22] Filed: Aug. 29, 1973

[21] Appl. No.: 392,417

[30] Foreign Application Priority Data
Sept. 6, 1972   Japan.............................. 47-103739

[52] U.S. Cl................................. 354/286; 350/257
[51] Int. Cl.² ..................... G03B 17/00; G03B 7/02
[58] Field of Search ........ 95/42, 44 R, 45; 350/247, 350/252, 257

[56] References Cited
UNITED STATES PATENTS
| | | | |
|---|---|---|---|
| 3,388,647 | 6/1968 | Yajima............................ | 95/44 R X |
| 3,620,149 | 11/1971 | Ogihara............................. | 95/44 R |
| 3,682,069 | 8/1972 | Lecoeur............................. | 95/44 R |

FOREIGN PATENTS OR APPLICATIONS
1,810,353   6/1970   Germany........................... 354/286

*Primary Examiner*—Samuel S. Matthews
*Assistant Examiner*—Alan Mathews
*Attorney, Agent, or Firm*—William R. Woodward

[57] ABSTRACT

A connecting ring carrying bayonet joint prongs on an internal end flange is provided on the barrel of an interchangeable lens and in the dismounted condition of the lens the ring is locked against rotation by a detent spring and an indexing recess. Full insertion of the lens in the mounting washer of the camera body in the proper orientation, as determined by a positioning stud and recess, releases the locking arrangement of the connecting ring and allows the latter to be rotated to engage the bayonet joint and secure the lens barrel to the mounting washer.

5 Claims, 5 Drawing Figures

DEVICE FOR MOUNTING AND DISMOUNTING AN INTERCHANGEABLE LENS

BACKGROUND OF THE INVENTION

1. Field of the Invention

This invention relates to a device for mounting and dismounting an interchangeable lens of a camera.

2. Description of the Prior Art

In the interchangeable lenses of the type which is provided with a member such as preset aperture device or exposure meter interlocking member engageable with the body of a camera, it is required that the position of engagement of such a lens with the camera be precisely controlled so as to maintain the accuracy of exposure.

It is for this reason that the bayonet coupling system has been most commonly used, and a construction having means for positioning the stationary portion of the lens barrel against rotation with respect to the camera and also a rotatable connecting ring for coupling the lens to the mount portion of the camera has particularly been preferred from the viewpoint of maintaining the desired accuracy.

However, interchangeable lenses utilizing such a coupling system have encountered the problem that the connecting ring itself rotates after removal of the lens from the camera and must be returned to its normal mount position when a lens is again to be mounted to the camera. This has made the lens mounting procedure cumbersome.

SUMMARY OF THE INVENTION

The present invention eliminates the above-noted inconvenience by arranging the connecting ring so that, when a lens is removed from a camera, the connecting ring is locked against rotation in a predetermined dismount position and released from such locked condition by a force imparted thereto during the normal mounting operation.

To achieve this, the device for mounting and dismounting an interchangeable lens according to the present invention comprises means for positioning a lens barrel against rotation with respect to a camera, a connecting member provided with a threaded portion engaging the lens barrel and rotatable about the optical axis of the lens, and means for locking the connecting member against rotation in a predetermined position with respect to the lens barrel. The locking means is adapted to be released to permit rotation of the connecting member only when it is forced against the body of the camera in the mounting operation.

The invention will become more fully apparent from the following detailed description thereof taken in conjunction with the accompanying drawings.

DESCRIPTION OF THE PREFERRED EMBODIMENTS

Figure 1:
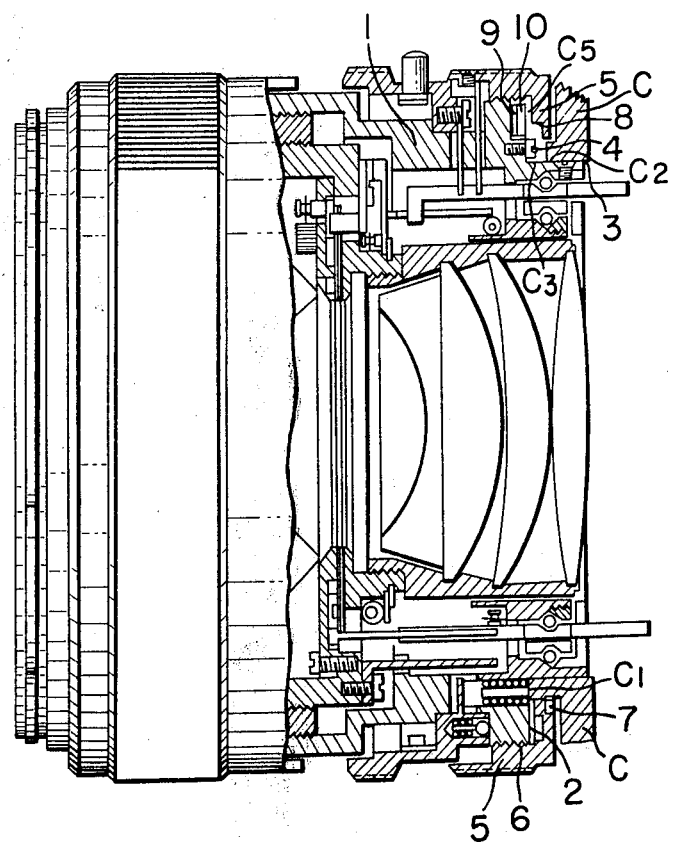
FIG. 1 is a partly broken-away side view partly in section of an interchangeable lens provided with the device according to the present invention.

Referring to the drawings, a mounting washer C having a plurality of bayonet clicks or prongs C4 formed in the outer periphery thereof is integrally secured to the front face of camera body (not shown). A stationary lens barrel of an interchangeable lens 1 is provided with a mounting portion complementary to the mounting washer.

The mounting portion includes a mounting surface 2 to be joined to the front face C1 of the mounting washer C, a shell portion 3 to fit within the inner periphery C2 of the washer C, and a positioning pin 4 studded in the mounting surface 2. The washer C is formed with a recess C3 for receiving therein the pin 4.

The stationary lens barrel 1 is externally threaded at 6 for rotatably receiving thereon a connecting ring 5. The ring 5 has a flange portion 7 for engagement with the bayonet clicks C4 of the washer C, and the flange 7 is formed with a plurality of relieved portions $7_1$ corresponding to the prongs C4, alternating with the matching prongs between the relieved portions.

The mounting surface 2 of the interchangeable lens is partly recessed so as to securely accommodate a plate spring 9. The spring 9 has a pin 10 secured to one end thereof and normally urged against the flange 7. The flange 7 is formed with a recess 12 in which the pin 10 may be engageably received to lock the ring 5 against rotation when the ring 5 is in its dismount position. In such position, the pin 10 only partly rides on one of the relieved portions $7_1$ so as to be engageable with a corresponding bayonet prong C4 during dismounting.

Figure 2:
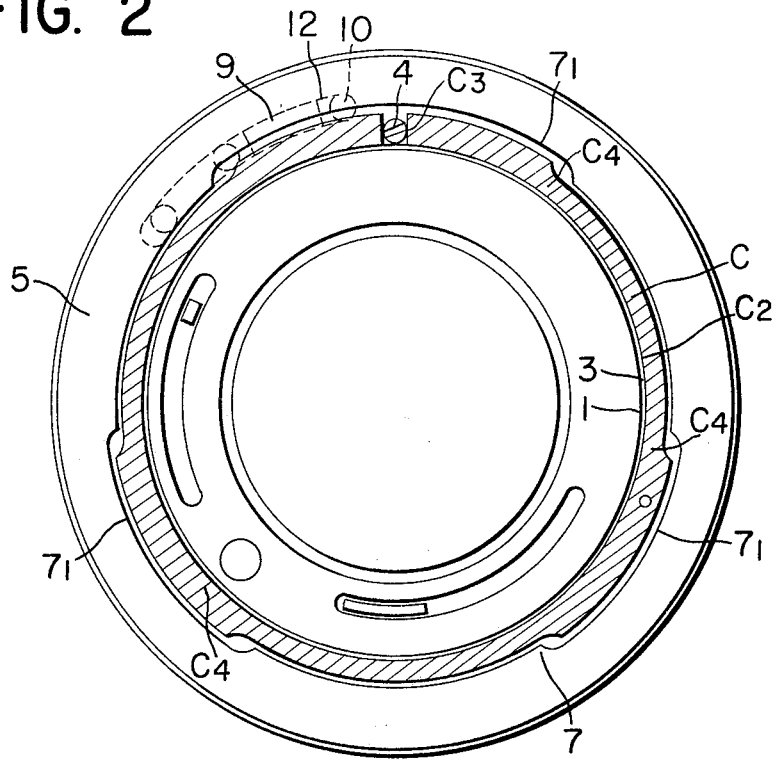
FIG. 2 is a rear end view of the lens shown in FIG. 1 showing also, in section, the bayonet joint part of the mounting washer of a camera.
Figure 3:
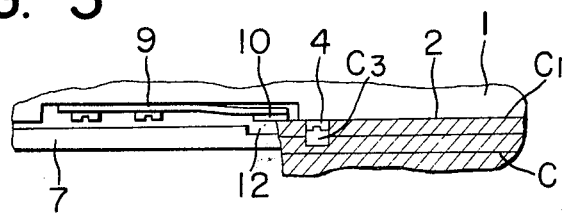
FIGS. 3 to 5 illustrate the manner in which the lens is mounted and dismounted with respect to a camera, FIG. 3 showing partly in section the connecting ring released from its locked state into its normal dismount position, FIG. 4 showing the connecting ring in its rotated position, and FIG. 5 showing the connecting ring in its locked position.
Figure 4:
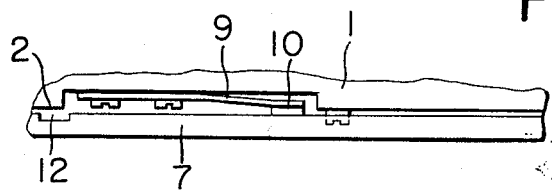
Figure 5:
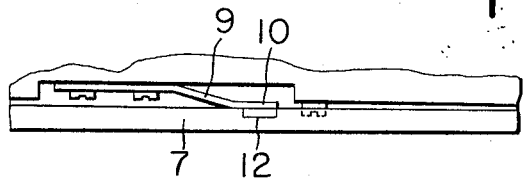

Mounting the interchangeable lens of the described construction to a camera will now be discribed. The ring 5 is normally locked in its dismount position with the pin 10 received in the groove 12 as shown in FIG. 5. Therefore, when the positioning pin 4 is fitted inside the inner periphery of the mounting washer C, the relieved portions $7_1$ of the ring 5 are brought into alignment with the bayonet prongs C4. Thus, when the lens is forced in until the mounting surface 2 bears against the front face of the washer C, one of the bayonet prongs C4 forces the pin 10 out of the recess 12 in the ring 5 as shown in FIG. 3, whereby the ring 5 is released from its locked condition. Then, the connecting ring 5 is then rotated counterclockwise as viewed in FIG. 2, whereby the inward prong portions of the flange 7 come to the rear of the outward bayonet prongs C4 for engagement therewith. Thus, the rotation of the ring 5 causes the interchangeable lens to be moved axially into the camera with the aid of the thread 6, whereby the lens is positively fixed to the camera.

Removal of the lens from the camera may readily be accomplished by rotating the clamp ring 5 in the opposite direction (clockwise as viewed in FIG. 2) to thereby disengage the prongs of the flange 7 from the prongs C4, and then withdrawing the lens out of the camera. In this case, the pin 10 is again brought into the recess 12 so that rotation of the ring 5 is inhibited until the lens is remounted.

As has been described hitherto, the device of the present invention for positioning a lens against rotation with respect to a camera and fixing the lens immovably to the camera with rotation of a connecting member is designed such that the connecting member is normally locked in its dismount position, and such design inhibits rotation of the connecting member except during mounting or dismounting of the lens, thus greatly facilitating the lens interchange.

I claim:

1. An interchangeable lens having a device for mounting and dismounting it and comprising:

a lens barrel;

means for positioning the lens barrel against rotation with respect to a mounting member provided on a camera body, said positioning means being provided on said lens barrel and arranged to cooperate with mating positioning means on said mounting member;

a connecting member rotatably supported around the lens barrel, said connecting member having a first set of bayonet joint prong means for insertion between a second set of bayonet joint prong means provided on said mounting member while said connecting member is in a predetermined rotational position relative to said lens barrel and for securing the lens barrel to the mounting member of the camera by the rotation of said connecting member from said predetermined position; and locking means provided partly in the lens barrel and partly in said connecting member for locking said connecting member against rotation relative to the lens barrel in said predetermined position;

said locking means being engageable with the mounting member, when the lens barrel is fully inserted in said mounting member and held against rotation therein by said positioning means, to release said locking means and thereby to permit rotation of the connecting member to engage said first set of bayonet joint prong means with said second set of bayonet joint prong means and complete the mounting of the lens barrel.

2. An interchangeable lens according to claim 1, wherein said positioning means on said lens barrel comprises a projecting pin.

3. An interchangeable lens according to claim 1, wherein said connecting member is an internally threaded ring.

4. A interchangeable lens according to claim 5, wherein said locking means includes a plate spring and a pin secured to one end thereof and a mating recess for said pin.

5. An interchangeable lens according to claim 4 in which said plate spring is affixed to the lens barrel and said recess is provided on said connecting member.

* * * * *